Aug. 19, 1924.  1,505,873
G. D'ERAMO
DEVICE FOR DRAWING PARALLEL LINES
Filed April 6, 1923
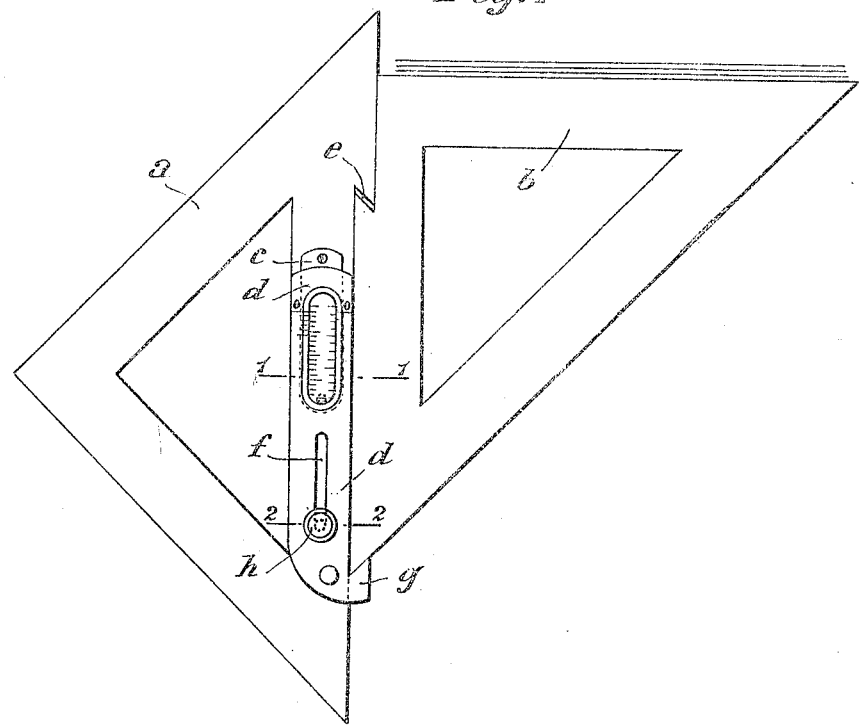
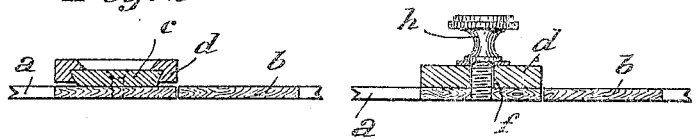
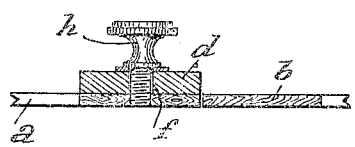
INVENTOR
GIUSEPPE D'ERAMO
BY
ATTORNEY Patented Aug. 19, 1924.

1,505,873

UNITED STATES PATENT OFFICE.

GIUSEPPE D'ERAMO, OF ROME, ITALY.

DEVICE FOR DRAWING PARALLEL LINES.

Application filed April 6, 1923. Serial No. 630,312.

*To all whom it may concern:*

Be it known that I, GIUSEPPE D'ERAMO, mechanical engineer, a subject of the King of Italy, and residing at Rome, Italy (whose post-office address is Via Galilei 27, Rome, Italy), have invented certain new and useful Improvements in Devices for Drawing Parallel Lines, of which the following is a specification.

The present invention comprises a device for drawing parallel lines composed of two small squares one sliding along the other provided with a slide and a nonius, the slide keeping the equal distance between the parallel lines to be drawn, the nonius measuring with micrometric approximation the relative shifting of one square respecting the other.

The invention is especially advantageous for hatching drawing it being possible by means of the slide and nonius to have parallel lines equally distant and at the distance required one from the other.

The device is illustrated as an example in the accompanying drawings in which:

Fig. 1 is a plan view; Fig. 2 shows a section on line 1—1; Fig. 3 is a section on line 2—2.

In the figures:

$a$—$b$ are two squares of convenient material as ebonite, wood, celluloid, metal alloys and the like, each being preferably an isosceles triangle, both being disposed in such a way that a cathetus of square $=b=$ may slide on the hypothenuse of square $=a=$.

The cathetus of square $=b=$ and the hypothenuse of square $=a=$ are broken away for a considerable length along the meeting edge thereof so as to form on each side a tooth-like abutment $=e=$ limiting the displacement of both squares on one side. On the square $=a=$ there is fixed a dovetailed guide $=c=$ on which a slide $=d=$ is displaceable parallel to the hypothenuse (Fig. 2) a pressure screw $=h=$ passes through the slot $=f=$ in the slide $=d=$ secures the slide to the square $=a=$ (Fig. 3). The end of slide $=d=$ near the opening $=f=$ has a projection $=g=$ forming the second abutment for the square $=b=$. The two squares then are displaceable with respect to each other between the two abutments $=e=$ and $=g=$ for the extent determined by the regulation of slide $=d=$, this slide being provided with a cut, through which the divisions of a graduation may be seen, and with an index and nonius on the edge of said cut, the nonius serving to regulate the position of the slide with respect to the graduation or to indicate such position.

When parallel lines are to be drawn at a settled distance with the greatest accuracy, slide $=d=$ is moved to the distance required then it is fixed by means of the pressure screw $=h=$, the square $=b=$ being afterwards shifted till it is stopped by projection $=g=$.

When parallel lines at equal settled distance are to be drawn in cm. or mm. or fractions of mm. or in inches or fractions of inches the device is disposed as illustrated in Fig. 1. After drawing the line the square $=a=$ is lowered till the slot $=e=$ is in correspondence with the slot of square $=b=$; then square $=b=$ is lowered until it is stopped by projection $=g=$ and so on.

The position of one square with respect to the other may be different as well as one of the squares may be contained in the hollow part of the other. The slide may be provided or not with a nonius so as to point out any shifting, any guiding line whatever on a millimeter graduation being sufficient.

Having now particularly described and ascertained the nature of my said invention and in what manner the same is to be performed I declare that what I claim is:

A device for accurate drawing parallel lines at an equal given distance with micrometric approximation consisting in the combination of two squares of any suitable material disposed with the cathetus of square $=b=$ slidable along the hypothenuse of square $=a=$, a graduated guide on the hypothenuse of the square $=a=$, a longitudinally slotted slide mounted on the guide and having a guiding line and nonius subdivisions thereon, said slide being provided at one end with a projection extending into the path of the other square and limiting the movement of the latter, and a thumb screw passing through the slot and securing the slide to the square, the squares being provided with abutments $=c=$ fixing the relative position when coinciding with the zero of a nonius on the slide $=d=$, the graduations of guide and slide being in millimeters and in inches.

In testimony whereof I have hereunto signed my name in the presence of two witnesses.

GIUSEPPE D'ERAMO.

Witnesses:
 BORTOLUZZI TOMMASA,
 PERROLLA DONATO.